US011265224B1

(12) United States Patent
Bogado et al.

(10) Patent No.: US 11,265,224 B1
(45) Date of Patent: Mar. 1, 2022

(54) LOGICAL NETWORK VISUALIZATION

(71) Applicant: VMWARE, INC., Palo Alto, CA (US)

(72) Inventors: Matt Bogado, Mountain View, CA (US); Tarang Khandelwal, Pune (IN); Priyanka Luthra, Pune (IN); Shrinivas Sharad Parashar, Pune (IN); Amogh Rane, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/182,279

(22) Filed: Feb. 23, 2021

(30) Foreign Application Priority Data

Dec. 31, 2020 (IN) .............................. 202041057384

(51) Int. Cl.
| H04L 12/24 | (2006.01) |
| H04L 41/12 | (2022.01) |
| H04L 41/22 | (2022.01) |
| H04L 41/14 | (2022.01) |
| H04L 41/00 | (2022.01) |

(52) U.S. Cl.
CPC .............. *H04L 41/12* (2013.01); *H04L 41/14* (2013.01); *H04L 41/22* (2013.01); *H04L 41/24* (2013.01)

(58) Field of Classification Search
CPC ......... H04L 29/08135; H04L 29/08513; H04L 41/065; H04L 41/12; H04L 41/14; H04L 41/22; H04L 41/24; H04L 43/04–045; H04L 45/02; H04L 67/10; H04L 67/1089
See application file for complete search history.

(56) References Cited

U.S. PATENT DOCUMENTS

| 6,952,208 | B1 * | 10/2005 | Arquie | ................... G06T 11/206 345/440 |
| 7,315,985 | B1 * | 1/2008 | Gauvin | .................... H04L 41/12 715/734 |
| 2006/0026509 | A1 * | 2/2006 | Porter | ..................... H04L 41/22 715/246 |
| 2015/0143268 | A1 * | 5/2015 | Retlich | ............. G05B 23/0272 715/763 |
| 2016/0072676 | A1 * | 3/2016 | Gomadam | .......... H04L 41/0843 709/221 |
| 2016/0094431 | A1 * | 3/2016 | Hall | ........................ H04L 67/02 709/224 |
| 2016/0357424 | A1 * | 12/2016 | Pang | ....................... G06F 16/17 |
| 2017/0085446 | A1 * | 3/2017 | Zhong | ..................... H04L 41/12 |
| 2020/0336387 | A1 * | 10/2020 | Suzuki | .................... H04L 41/22 |
| 2021/0036934 | A1 * | 2/2021 | Vijayan | .................... G06F 3/002 |

* cited by examiner

*Primary Examiner* — Brendan Y Higa
(74) *Attorney, Agent, or Firm* — Su IP Consulting

(57) ABSTRACT

Example methods and systems for logical network visualization. One example may comprise a computer system obtaining and processing topology information identifying a set of logical network elements. To visualize the set of logical network elements, the computer system may configure logical network topology graph is configured to include a multi-level group node that is formed using (a) a parent group node and (b) a child group node. The parent group node may be configured in a folded state to visualize multiple first elements and associated with parent group node information. The child group node may be configured in a folded state to visualize multiple second elements and associated with child group node information. The computer system may interact with a user device to cause display of the parent group node and the child group node along with the respective parent group node information and child group node information.

21 Claims, 9 Drawing Sheets

```
{ "id" : "/infra/tier-0s/T0-GW",                                      410
  "properties" : {
    "path" : "/infra/tier-0s/T0-GW",
    "level" : 0,
    "ha_mode" : "ACTIVE_STANDBY",
    "ip_addresses" : [ {
        "node" : "T1-GW1","label" : "10.2.1.0/31"}, {
        "node" : "T1-GW2","label" : "10.2.1.2/31" }],
    "uplink_ips" : [ "10.16.10.1/24",
                     "10.16.11.1/24" ],
    "resource_type": "T0-GW",
    "services" : [ { "type" : "Rule","count" : 1 } ],
    "display_name" : "T0-GW" },
```

```
"children" : {                                                        420
  "/infra/tier-1s/T1-GW1" : {
  "id" : "/infra/tier-1s/T1-GW1",
  "properties" : {
    "path" : "/infra/tier-1s/T1-GW1",
    "level" : 1,
    "hierarchy" : {
        "0" : [ "/infra/tier-0s/T0-GW"]},
    "resource_type" : "T1-GW",
    "ip_address" :  "10.2.1.1/31",
    "services" : [ { "type" : "DhcpServer","count" : 1 },
                   { "type" : "Rule", "count" : 1 } ],
    "display_name"   : "T1-GW1",
    "failover_mode" : "PREEMPTIVE" },
```

```
"children" : {                                                        430
  "/infra/tier-1s/T1-GW1/segments/SEG-11" :{
  "id" : "/infra/tier-1s/T1-GW1/segments/SEG-11",
  "properties" : {
    "path" : "/infra/tier-1s/T1-GW1/segments/SEG-11",
    "sub_type" : "OVERLAY",
    "level" : 2,
    "ip_addresses" : [ {"node" : "/infra/tier-1s/T1-GW1",
                        "label" : "10.16.14.1/24"  }],
    "hierarchy" : {
        "0" : [ "/infra/tier-1s/T1-GW1" ],
        "1" : [ "/infra/tier-0s/T0-GW" ]},
    "resource_type" : "SEGMENT",
    "services" : [{ "type" : "DhcpServer","count" : 1}],
    "display_name" : "SEG-11" },
    "child_count" : { "VirtualMachine" : 3 }}}
```

Fig. 4

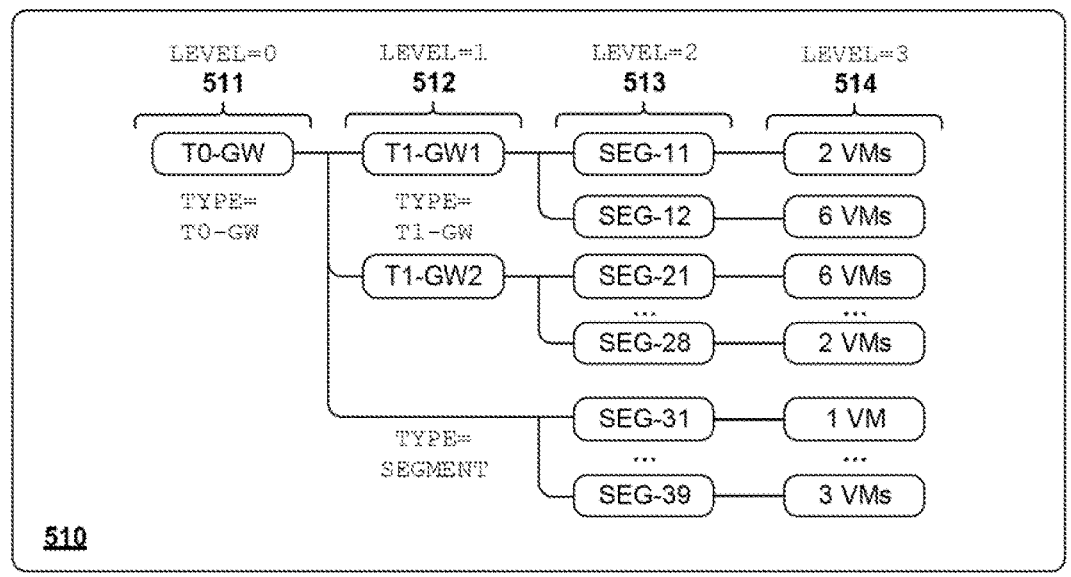
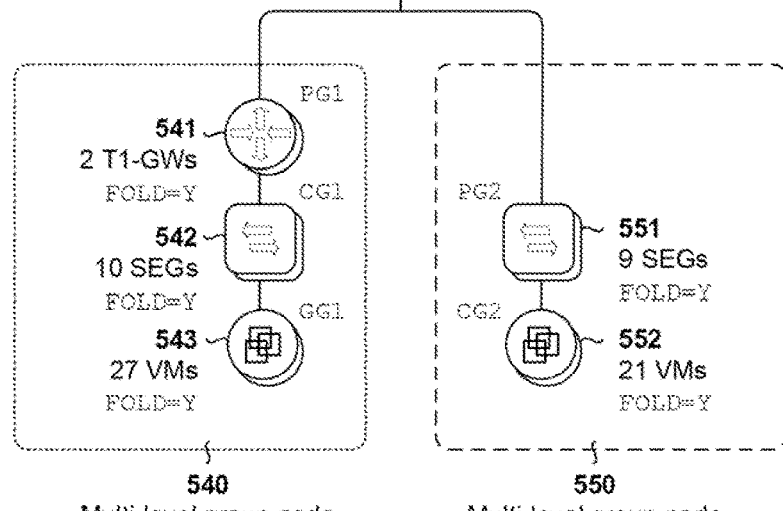
Fig. 5

LOGICAL NETWORK VISUALIZATION

RELATED APPLICATIONS

Benefit is claimed under 35 U.S.C. 119(a)-(d) to Foreign Application Serial No. 202041057384 filed in India entitled "LOGICAL NETWORK VISUALIZATION", on Dec. 31, 2020, by VMware, Inc., which is herein incorporated in its entirety by reference for all purposes.

BACKGROUND

Virtualization allows the abstraction and pooling of hardware resources to support virtual machines in a software-defined networking (SDN) environment, such as a software-defined data center (SDDC). For example, through server virtualization, virtual machines (VMs) running different operating systems may be supported by the same physical machine (also referred to as a "host"). Each VM is generally provisioned with virtual resources to run an operating system and applications. The virtual resources may include central processing unit (CPU) resources, memory resources, storage resources, network resources, etc. Through virtualization of networking services, logical network elements may be deployed to provide logical connectivity among VMs or other virtualized computing instances. In practice, it is desirable to provide a visualization of the logical network elements, such as to facilitate network configuration, troubleshooting and diagnosis.

BRIEF DESCRIPTION OF DRAWINGS

FIG. 4 is a schematic diagram illustrating an example topology information associated with a logical network environment;

FIG. 5 is a schematic diagram illustrating an example configuration of a logical network topology graph that includes multi-level group node(s);

DETAILED DESCRIPTION

Figure 1:
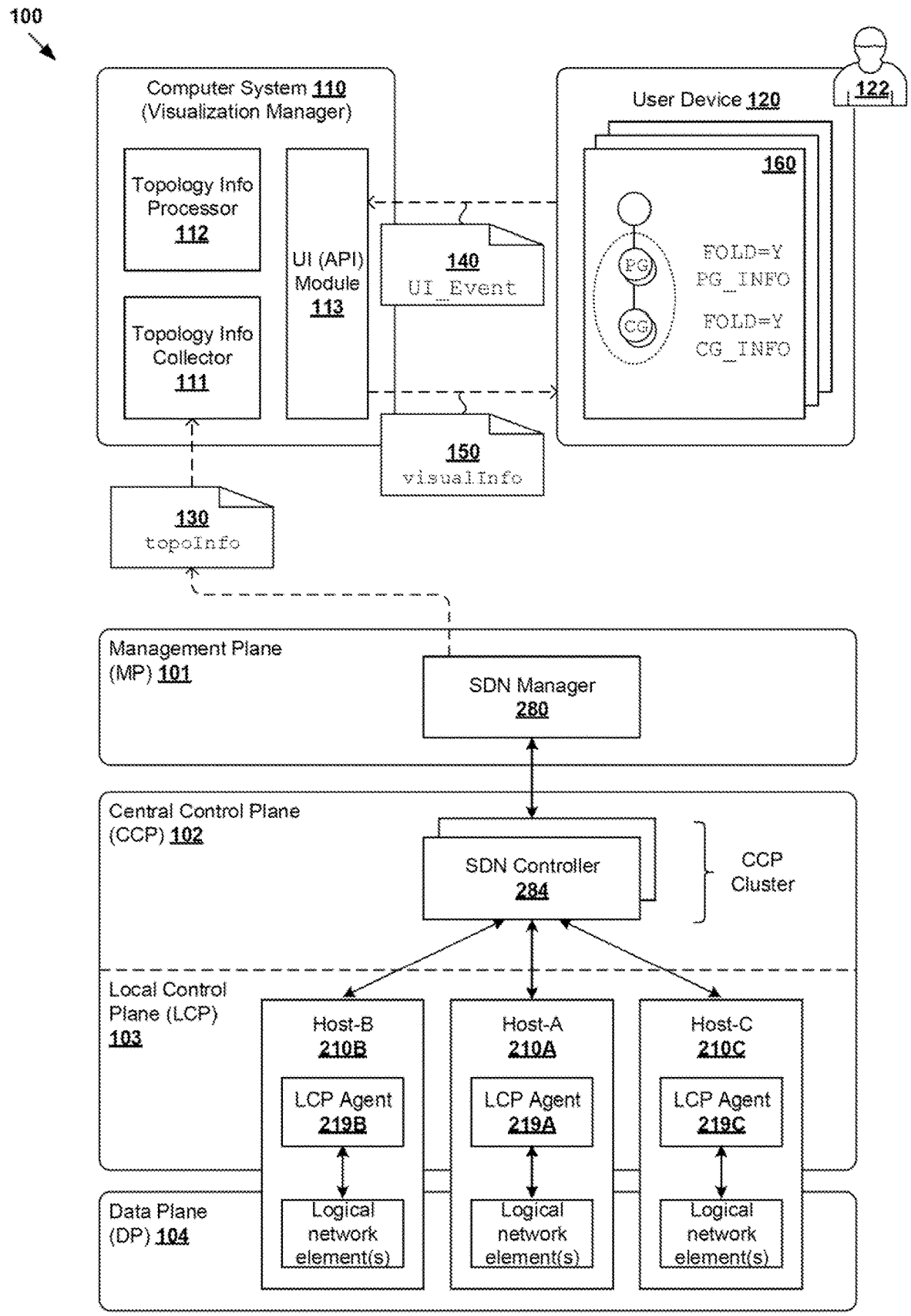
FIG. 1 is a schematic diagram illustrating an example system architecture for logical network visualization.

According to examples of the present disclosure, logical network visualization may be improved manner to facilitate visualization of a large-scale logical network environment. One example may involve a computer system (e.g., visualization manager 110 in FIG. 1) processing topology information to identify (a) multiple first elements that are connected with (b) multiple second elements from a set of logical network elements. To visualize the set of logical network elements, a topology graph may be configured to include a "multi-level group node" that is formed using (a) a parent group (PG) to visualize the first elements and (b) a child group (CG) to visualize the second elements. Both the parent and child groups may be configured in a "folded state" to reduce cognitive overhead on users and enhance user experience. Depending on the desired implementation, visualization granularity may be adjusted, such as by transitioning the folded state into an "expanded state," and vice versa. This way, the efficiency relating to network configuration, troubleshooting and diagnosis based on the topology graph may be improved. Various examples will be discussed below.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used throughout the present disclosure to describe various elements, these elements should not be limited by these terms. These terms are used to distinguish one element from another. For example, a first element may be referred to as a second element, and vice versa.

FIG. 1 is a schematic diagram illustrating example system architecture 100 for logical network visualization. It should be understood that, depending on the desired implementation, example system architecture 100 may include additional and/or alternative components than that shown in FIG. 1. Example system architecture 100 may include a computer system capable of acting as visualization manager 110 to interact with various entities in software-defined networking (SDN) environment 200 (to be discussed further using FIG. 2). For example, visualization manager 110 may interact with SDN manager 280 residing on a management plane (see MP 101) and SDN controller 284 residing on a central control plane (see CCP 102). SDN manager 280 and/or SDN controller 284 may interact with hosts 210A-C, which support respective agents 219A-C residing on a local control plane (see LCP 103) as well as logical network elements residing on a data plane (see DP 104).

Depending on the desired implementation, visualization manager 110 may include any suitable hardware and/or software components implementing topology information collector 111, topology information processor 112 and a user interface (UI) module, such as application programming interface (API) module 113. For example, topology information collector 111 may be configured to interact with SDN manager 280 to obtain topology information 130 (topoInfo) associated with logical networks deployed in SDN environment 200. Topology information processor 112 may be configured to process topology information 130 to generate visualization information 150 (visualInfo). Visualization manager 110 may be implemented as part of management plane 101, such as component of data center management platform VMware NSX® Unified Appliance (available from VMware, Inc.)

User(s) 122 operating with user device(s) 120 may interact with visualization manager 110 for visualization information 150 associated with logical networks deployed in SDN environment 200. Visualization manager 110 may support any suitable UI to handle visualization requests (see 140) from user device(s) 120, such as API module 113, graphical user interface (GUI), command-line interface (CLI), representational state transfer (REST) API, etc. In practice, visualization manager 110 may support module(s) or component(s) to facilitate logical network configuration, troubleshooting and diagnosis in SDN environment 200.

SDN manager 280 and SDN controller 284 are example network management entities that may be implemented using physical machine(s), VM(s), or both in SDN environment 200. One example of an SDN controller is the NSX controller component of VMware NSX® (available from VMware, Inc.). SDN controller 284 may be a member of a controller cluster (not shown for simplicity) that is configurable using SDN manager 280. For example, logical switches, logical routers, and logical overlay networks may be configured using SDN controller 284, SDN manager 280, etc. To send or receive control information, a local control plane (LCP) agent 219A/219B/219C on host 210A/210B/210C may interact with SDN controller 284 via control-plane channel 201/202/203 (shown in FIG. 2).

Figure 2:
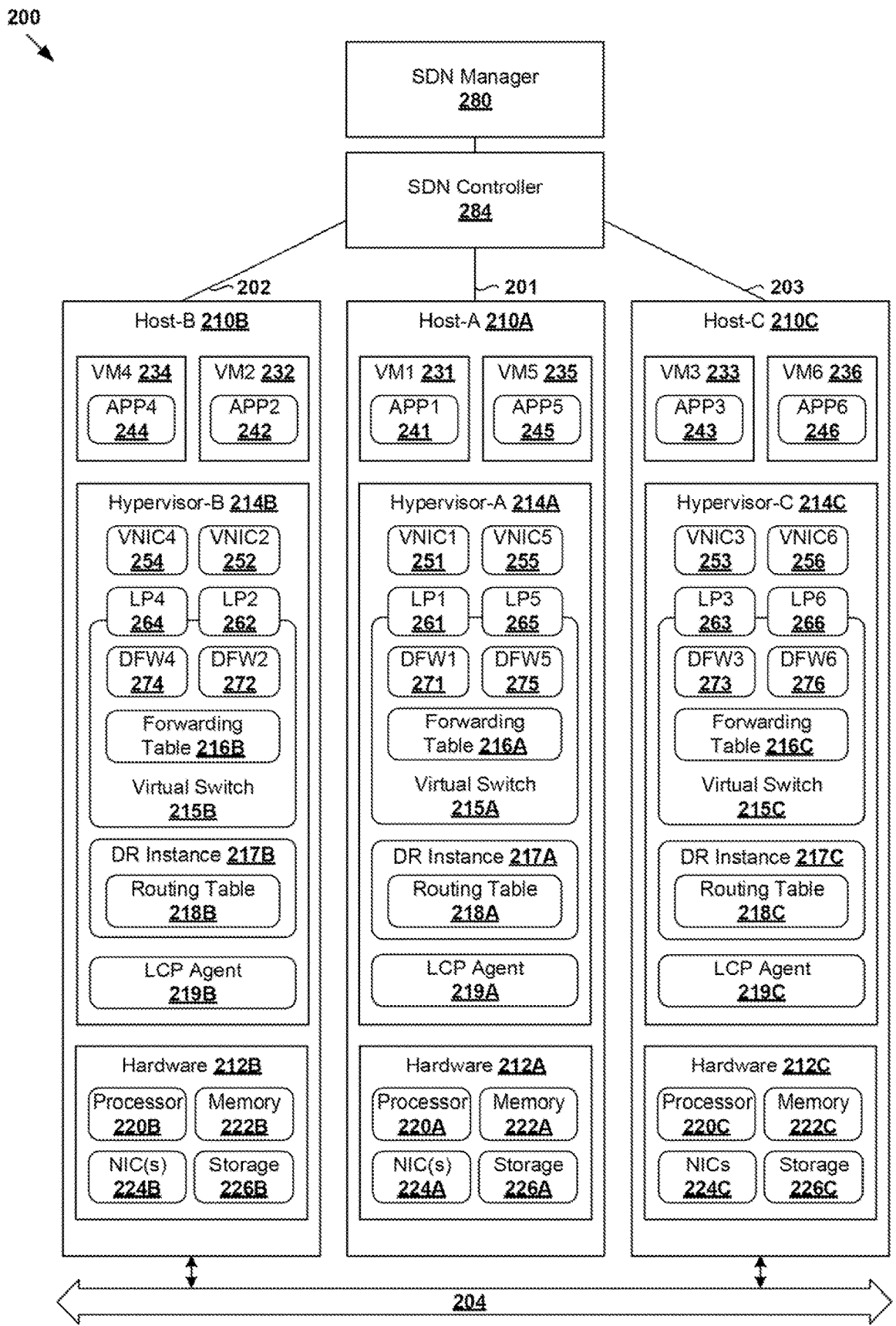
FIG. 2 is a schematic diagram illustrating an example software-defined networking (SDN) environment for which logical network visualization may be performed.

In more detail, FIG. 2 is a schematic diagram illustrating example SDN environment 200 for which logical network visualization may be performed. Depending on the desired implementation, SDN environment 200 may include additional and/or alternative components than that shown in FIG. 1. SDN environment 200 includes multiple hosts 110A-C that are inter-connected via physical network 204. In practice, SDN environment 200 may include any number of hosts (also known as a "host computers", "host devices", "physical servers", "server systems", "transport nodes," etc.), where each host may be supporting tens or hundreds of virtual machines (VMs).

Each host 210A/210B/210C may include suitable hardware 212A/212B/212C and virtualization software (e.g., hypervisor-A 214A, hypervisor-B 214B, hypervisor-C 214C) to support various VMs. For example, hosts 210A-C may support respective VMs 231-236 (see also FIG. 2). Hypervisor 214A/214B/214C maintains a mapping between underlying hardware 212A/212B/212C and virtual resources allocated to respective VMs. Hardware 212A/212B/212C includes suitable physical components, such as central processing unit(s) (CPU(s)) or processor(s) 220A/220B/220C; memory 222A/222B/222C; physical network interface controllers (NICs) 224A/224B/224C; and storage disk(s) 226A/226B/226C, etc.

Virtual resources are allocated to respective VMs 231-236 to support a guest operating system (OS) and application(s). For example, VMs 231-236 support respective applications 241-246 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 2, VNICs 251-256 are virtual network adapters for VMs 231-236, respectively, and are emulated by corresponding VMMs (not shown for simplicity) instantiated by their respective hypervisor at respective host-A 210A, host-B 210B and host-C 210C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 214A/214B/214C implements virtual switch 215A/215B/215C and logical distributed router (DR) instance 217A/217B/217C to handle egress packets from, and ingress packets to, corresponding VMs. To protect VMs 231-236 against security threats caused by unwanted packets, hypervisors 214A-C may implement firewall engines to filter packets. For example, distributed firewall (DFW) engines 271-276 (see "DFW1" to "DFW6") are configured to filter packets to, and from, respective VMs 231-236 according to firewall rules. In practice, network packets may be filtered according to firewall rules at any point along a datapath from a VM to corresponding physical NIC 224A/224B/224C. For example, a filter component (not shown) is incorporated into each VNIC 251-256 that enforces firewall rules that are associated with the endpoint corresponding to that VNIC and maintained by respective DFW engines 271-276.

Through virtualization of networking services in SDN environment 200, logical networks (also referred to as overlay networks or logical overlay networks) may be provisioned, changed, stored, deleted and restored programmatically without having to reconfigure the underlying physical hardware architecture. A logical overlay network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts, which may reside on different layer 2 physical networks. Hypervisor 214A/214B/214C may implement a virtual tunnel endpoint (VTEP) (not shown) to perform encapsulation and decapsulation for packets that are sent via a logical overlay tunnel that is established over physical network 204.

In practice, logical switches and logical routers may be deployed to form logical networks in a logical network environment. The logical switches and logical DRs may be implemented in a distributed manner and can span multiple hosts. For example, logical switches that provide first-hop, logical layer-2 connectivity (i.e., an overlay network) may be implemented collectively by virtual switches 215A-C and represented internally using forwarding tables 216A-C at respective virtual switches 215A-C. Forwarding tables 216A-C may each include entries that collectively implement the respective logical switches. VMs that are connected to the same logical switch are said to be deployed on the same logical layer-2 segment. Further, logical DRs that provide logical layer-3 connectivity may be implemented collectively by DR instances 217A-C and represented internally using routing tables 218A-C at respective DR instances 217A-C. Routing tables 218A-C may each include entries that collectively implement the respective logical DRs.

Packets may be received from, or sent to, each VM via an associated logical port. For example, logical switch ports 261-266 (see "LP1" to "LP6") are associated with respective VMs 231-236. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-C in FIG. 2, whereas a "virtual switch" may refer generally to a software switch or software implementation of a physical switch. In practice, there is usually a one-to-one mapping between a logical port on a logical switch and a virtual port on virtual switch 215A/215B/215C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

In a data center with multiple tenants requiring isolation from each other, a multi-tier topology may be used. For example, a two-tier topology includes an upper tier-0 (T0) associated with a provider logical router (PLR) and a lower tier-1 (T1) associated with a tenant logical router (TLR). The multi-tiered topology enables both the provider (e.g., data center owner) and tenant (e.g., data center tenant) to control their own services and policies. Each tenant has full control over its T1 policies, whereas common T0 policies may be applied to different tenants. A T0 logical router may be deployed at the edge of a geographical site to act as gateway between internal logical network and external networks, and also responsible for bridging different T1 logical routers associated with different data center tenants Further, a logical router may be a logical DR or logical service router (SR). A DR is deployed to provide routing services for VM(s) and implemented in a distributed manner in that it may span multiple hosts that support the VM(s). An SR is deployed to provide centralized stateful services, such as IP address assignment using dynamic host configuration protocol (DHCP), intrusion detection, load balancing, network address translation (NAT), etc. In practice, SRs may be implemented using edge appliance(s), which may be VM(s) and/or physical machines (i.e., bare metal machines). SRs are capable of performing functionalities of a switch, router, bridge, gateway, edge appliance, or any combination thereof. As such, a logical router may be categorized as one of the following types: T1-DR, T1-SR, T0-DR and T0-SR.

In practice, it is desirable to provide user(s) 122 with a visualization of various logical switches and logical routers that are deployed in a logical network environment. Conventionally, a tree or graph structure may be used to visualize all the logical switches and logical routers as well as their inter-relationships. However, as SDN environment 200 increases in scale and complexity, it may be challenging to visualize a large number of logical network elements for user(s) 122 to extract meaningful information out of the visualization. For example, a logical router may be connected to a large number (e.g., thousands) of other logical routers and/or logical switches, which are in turn connected to a large number of VMs. The challenge relating to logical network visualization increases as the number of levels in the tree or graph increases.

Logical Network Visualization

According to examples of the present disclosure, logical network visualization may be improved to facilitate visualization of a large number of logical network elements. Instead of displaying each and every element in a large-scale logical network environment, a logical network topology graph may be configured to include a "multi-level group node" to visualize multiple elements associated with different levels (e.g., tier-1 gateway, segments, VMs, etc). As SDN environment 200 increases in scale and complexity, any improvement in logical network visualization may facilitate improved network configuration, troubleshooting and diagnosis.

Figure 3:
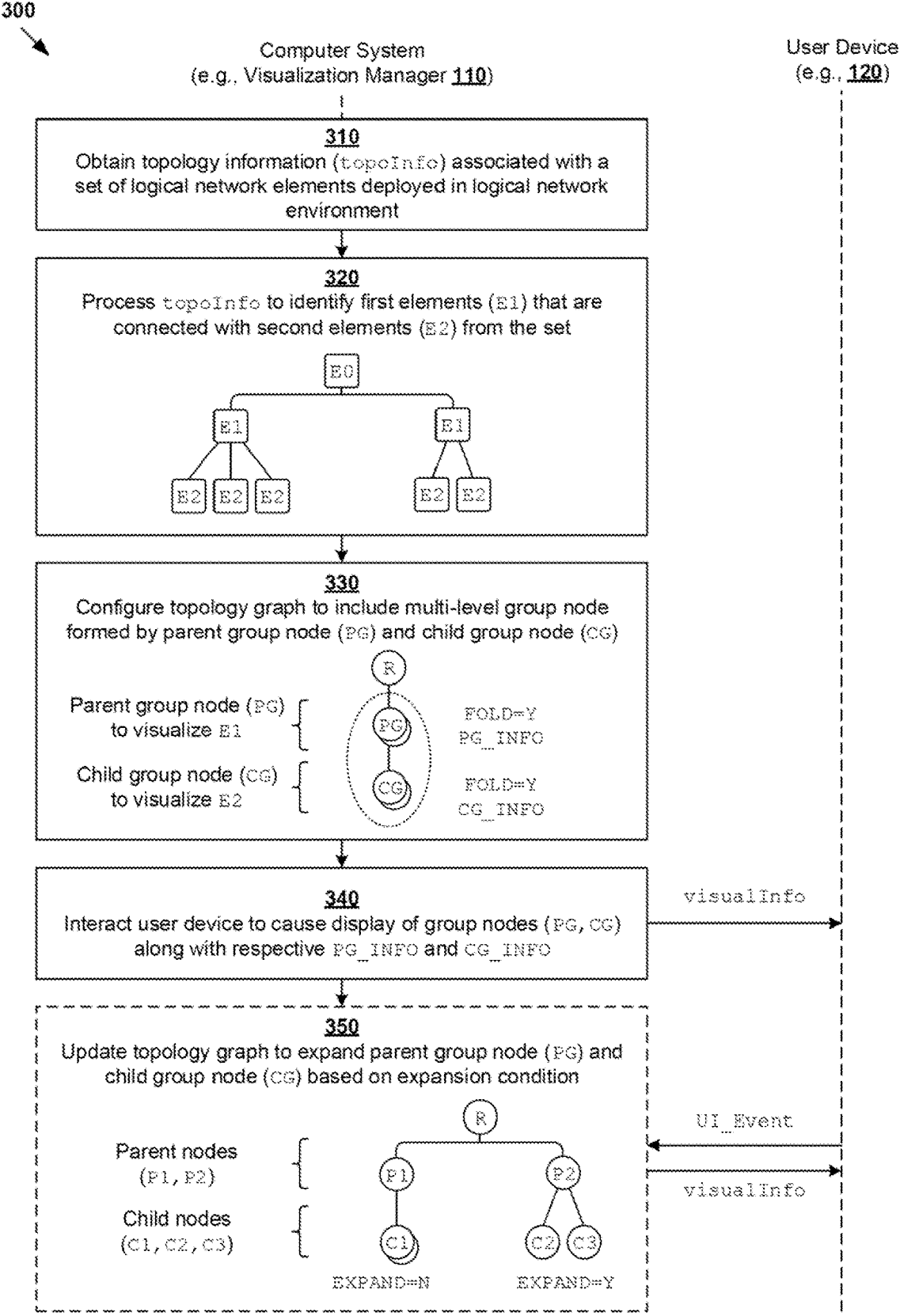
FIG. 3 is a flowchart of an example process for a computer system to perform logical network visualization.

In more detail, FIG. 3 is a flowchart of example process 300 for a computer system to perform logical network visualization. Example process 300 may include one or more operations, functions, or actions illustrated by one or more blocks, such as 310 to 350. The various blocks may be combined into fewer blocks, divided into additional blocks, and/or eliminated depending on the desired implementation. Examples of the present disclosure may be performed using visualization manager 110 ("computer system"), which may be configured to support any suitable hardware and/or software components such as topology information collector 111, topology information processor 112, API module 113, etc.

At 310 in FIG. 3, visualization manager 110 (e.g., topology information collector 111) may obtain topology information (topoInfo) identifying a set of logical network elements deployed in a logical network environment. Here, the term "logical network environment" may refer generally to a network environment that includes inter-connecting logical network elements. A "logical network element" may be a gateway, edge appliance, logical router, logical switch, logical router port, logical switch port, virtualized computing instance (e.g., VM or container), etc. The term "obtain" may refer generally to receiving or retrieving information from a source (e.g., SDN manager 280, SDN controller 284) or datastore in which the information is stored.

At 320 in FIG. 3, visualization manager 110 (e.g., topology information processor 112) may process the topology information to identify (a) multiple first elements (E1) that are connected with (b) multiple second elements (E2) from the set of logical network elements. Here, the term "processing" may include any suitable operation(s), such as information analysis, matching with rule(s) or condition(s), classification, etc. For example in FIG. 3, the first elements (E1) may be connected with one or more second elements (E2). The first elements (E1) may in turn connect to another element (E0), such as a T0 gateway (e.g., a gateway with logical DR and SR functionalities).

At 330 in FIG. 3, visualization manager 110 (e.g., topology information processor 112) may configure a logical network topology graph to visualize the set of logical network elements. The logical network topology graph may be configured to include a multi-level graph node that is formed using (a) a parent group node (PG) and (b) a child group node (CG) that are both configured in a folded state. Here, the term "group node" may refer generally to a single node (i.e., UI object) for visualizing multiple logical network elements. The term "folded state" may refer generally to the configuration of a single node to visualize multiple elements. In contrast, the term "expanded state" may refer generally to the configuration of multiple nodes to visualize respective multiple elements, thereby expanding the single node in the folded state.

The parent group node (PG) may be configured in a folded state (see FOLD=Y) to visualize the first elements (E1) and associated with parent group information (PG_INFO). The child group node (CG) may be configured in a folded state (see FOLD=Y) to visualize the second elements (E2) and associated with child group information (CG_INFO). As will be described using FIGS. 4-8, any suitable "first elements" and "second elements" may be visualized. In one example, the parent group node (PG) may visualize first elements (E1)=T1 gateways. In this case, the child group node (CG) may visualize second elements (E2)=logical layer-2 segments supported by respective logical switches. The parent group (PG) may be connected to another node (R) for visualizing element (E0)=T0 gateway shown in block 320.

At 340 in FIG. 3, visualization manager 110 (e.g., topology information processor 112) may interact with user device 120 to cause a display of the multi-level group node. In particular, the parent group node (PG) and child group node (CG) may be displayed on a user interface (see 160 in FIG. 1) supported by user device 120 along with the respective parent group information (PG_INFO) and child group information (CG_INFO). In practice, block 340 may involve visualization manager 110 generating and sending visualization information (visualInfo) specifying the logical network topology graph to user device 120 via API module 113. The visualization information may be generated and sent in response to a request from user device 120. See 140, 150 and 160 in FIG. 1.

Multi-level group nodes may be transitioned between a folded state and an expanded state to adjust the granularity of logical network visualization. For example, at 350 in FIG. 3 (see dashed box), in response to detecting a UI event to expand the parent group node (PG), visualization manager 110 may update the logical network topology graph at block 330 to expand both the parent group node (PG) and child group node (CG) based on an expansion condition. Alternatively, in response to detecting a UI event to expand the child group node (CG), visualization manager 110 may update the logical network topology graph to expand both the parent group node (PG) and child group node (CG). By expanding the parent group node (PG), the updated graph may include multiple parent nodes (P1, P2) to visualize multiple first elements. By expanding the child group node (CG), the updated graph may include multiple child nodes (C1, C2) per parent node to visualize multiple second elements.

Visualization manager 110 may also determine whether an expansion condition is satisfied, such as whether the number of elements exceeds a user-configurable threshold (to be discussed further using FIGS. 6-9). In the example in FIG. 3, the expansion condition is not satisfied for a first parent node (P1), in which case a single child node (C1) is configured in a folded state to visualize multiple second elements (e.g., single node for two VMs). In contrast, the expansion condition is satisfied for second parent node (P1) in FIG. 3. In this case, multiple child nodes (C2, C3) are configured to visualize respective second elements (e.g., five nodes for five VMs). As such, expanding a parent group node (PG) in block 330/350 may split up associated child group node (CG) per each parent node. Similarly, expanding a child group node (CG) may split up associated parent group node per child node. Group node expansions will be exemplified using FIGS. 5-8.

Using examples of the present disclosure, visualization manager 110 may facilitate interaction with a large number of logical network elements deployed in a logical network environment. Using multi-level group nodes that provide a higher level view of the logical network elements, the cognitive overhead on end users 122 may be reduced, particularly when they are scanning the visualization to better understand and identify the number of connections that exist in a logical network environment. In the following, various examples will be discussed using FIGS. 4-8.

Topology Information Processing

FIG. 4 is a schematic diagram illustrating example topology information 400 associated with a logical network environment. In this example, topology information 400 may identify a set of logical network elements that are deployed in a logical network environment. Each logical network element may be associated with a level, such as "0" for the highest level, "1" for the second highest level and so on. Also, each logical network element may be associated with a resource type, such as "T0-GW" for a T0 gateway, "T1-GW" for a T1 gateway, "SEGMENT" for a logical layer-2 segment associated with a logical switch, etc.

At 410 in FIG. 4, topology information 400 may be processed to identify a T0 gateway that is configured with ID="/infra/tier-0s/T0-GW" and level="0." The T0 gateway may be assigned with various attributes (see "properties"), such as path information, high availability mode (e.g., ha_mode=ACTIVE_STANDBY), IP address information of downlink nodes (e.g., T1 gateways labelled "T1-GW1" and "T1-GW2"), uplink IP address information associated with external network(s), resource type (e.g., "T0-GW"), services, display name (e.g., "T0-GW"), etc.

At 420 in FIG. 4, topology information 400 may be processed to identify a T1 gateway that is connected with the T0-gateway. The T1 gateway may be assigned with ID="/infra/tier-1s/T1-GW1" and various attributes (see "properties"), such as path information, level="1," connection with the T0 gateway (see "hierarchy"), IP address information, resource type (e.g., "T1-GW"), services, display name (e.g., "T1-GW1"), failover mode (e.g., PREEMPTIVE), etc.

At 430 in FIG. 4, topology information 400 may be processed to identify a logical layer-2 segment that is connected with the T1 gateway. The segment may be associated with ID="/infra/tier 1s/T1-GW1/segments/SEG-11" and level="2." Its attributes (see "properties") include path information, connection with the T0 gateway on level="0" and the T1 gateway on level="1" (see "hierarchy"), IP address information, resource type (e.g., "SEGMENT"), services (e.g., DHCP), display name (e.g., "SEG-11"), etc. Further, three VMs are connected to the logical layer-2 segment based on its child count specifying "VirtualMachine: 3".

In practice, the example in FIG. 4 may represent a snippet of topology information associated with a large-scale logical network environment. Some examples will be discussed below using FIG. 5, which is a schematic diagram illustrating example configuration 500 of a logical network topology graph that includes multi-level group node(s). In this case, topology information 400 may be processed by topology information processor 112 (see 501) to identify a set of logical network elements (see 510) that are associated with multiple levels 0-3 (see 511-514). Here, T1 gateways (see 512) that are connected with a T0 gateway (see 511) may be referred to as "first elements" from the set. Segments (see 513) that are connected with the T1 gateways may be referred to as "second elements."

For example, at 511 in FIG. 5 (level=0), a T0 gateway (T0-GW) that provides connectivity to external networks may be identified. At 512 (level=1), multiple T1 gateways (T1-GW1 and T1-GW2) and logical layer-2 segments (SEG-31 to SEG-39) that are connected with T0-GW may be identified. At 513 (level=2), two segments (SEG-11 to SEG-12) connected with T1-GW1 and eight segments (SEG-21 to SEG-28) with T1-GW2 may be identified. Further at 514 (level=3), various VMs are identified to be connected with the segments. For segments (SEG-31 to SEG-39) that are configured to be on level=2 and directly connected with T0-GW, they are each connected with one or more VMs on level=3.

Topology Graph Configuration

At 520 in FIG. 5, topology information processor 112 may configure a logical network topology graph to visualize the set of logical network elements (see 510) identified in FIG. 5. Topology graph 520 may include multiple UI objects that each represent one element, or a group of multiple elements from the set. Here, the term "UI object" may refer generally to a visual representation of a logical network element that may be displayed on a user interface. The UI object may be of any suitable shape and size (e.g., button, box) to illustrate the relevant element. See also 502 in FIG. 5.

In the example in FIG. 5, topology graph 520 may be configured to include a root node representing T0-GW (see 530) on level=0. Based on the number of resource types that are connected with T0-GW, topology information processor 112 may configure two multi-level group nodes (see 540 and 550). At 540, a first multi-level group node (G1) may be configured for a first resource type=T1-GW that is directly connected with T0-GW 530. At 550, a second multi-level group node (G2) may be configured for a second resource type=SEG that is also directly connected with T0-GW 530. Topology graph 520 includes separate connectors starting from T0-GW to respective multi-level group nodes 540-550.

(a) First Multi-Level Group Node

In more detail, at 540 in FIG. 5, topology information processor 112 may configure a first multi-level group node (G1) that is formed using a first parent group node (PG1), a connecting first child group node (CG1) and a grandchild group node (GG1). At 541, the first parent group node (PG1) may be configured in a folded state (i.e., FOLD=Y) to visualize two T1 gateways (i.e., T1-GW1 and T1-GW2) on level=1. At 542, the first child group node (CG1) may be configured in a folded state to visualize a total of ten segments on level=2, including SEG-11 and SEG-12 connected with T1-GW1 and SEG-21 to SEG-28 connected with T1-GW2. At 543, the first grandchild group node (GG1) may be configured in a folded state to visualize 27 VMs on level=3.

Using the folded state, it is not necessary to visualize each and every member of a group node to reduce visualization complexity and cognitive overhead on user(s) 122. Each group node may be associated with any suitable group information, such as the number of logical network elements visualized using the group node, the type of logical network elements, etc. For example, at 541, the first parent group node (PG1) may be associated with parent group information="2 T1-GWs." At 542, the first child group node (CG1) may be associated with child group information="10 SEGs." Similarly, at 543, the first grandchild group node (GG1) may be associated with child group information="27 VMs."

(b) Second Multi-Level Group Node

At 550 in FIG. 5, topology information processor 112 may configure a second multi-level group node (G2) that is formed using a second parent group node (PG2) and a second child group node (CG2). At 551, the second parent group node (PG2) may be configured in a folded state to visualize nine segments (i.e., SEG-31 to SEG-39) on level=2. Associated parent group information may specify "9 SEGs" to indicate the number and type of represented elements. At 552, the second child group node (CG2) may be configured in a folded state to visualize 21 VMs on lower level=3. Associated child group information may specify "21 VMs." Note that each of segments SEG-31 to SEG-39 may be connected with zero or more of the 21 VMs.

During the configuration process, in response to determination that a parent group node (PG1/PG2) is in a folded state (i.e., FOLD=Y), topology information processor 112 may also configure its associated child group node (CG1/CG2) in a folded state. This may be performed regardless of the number of elements visualized using that child group node. Similarly, if a child group node (CG1) is in a folded state, its grandchild group node (GG1) is also configured in a folded state. Again, may be performed regardless of the number of elements visualized using that grandchild group node. If there are further resource types with direct connection with T0-GW, additional multi-level group nodes may be configured.

Unlike conventional approaches, it should be understood that multi-level group node 540/550 provides a visualization of the relationship (e.g., logical connectivity) between parent group node 541/551 and child group node 542/552. The concept of folding nodes by resource types on each level may reduce the complexity of topology graph 520. This way, a higher-level view of potentially hundreds or thousands of logical network elements may be provided to reduce cognitive burden on user 122. This may in turn improve the efficiency of network configuration, troubleshooting and diagnosis activities based on topology graph 520 with reduced complexity.

Once topology graph 520 is configured, topology information processor 112 may interact with user device 120 by generating and sending visualization information (visualInfo) associated with topology graph 520 to user device 120. The visualization information may be in any suitable format to cause a display of topology graph 520 on a user interface of user device 120. Through API module 113, visualization manager 110 may facilitate interactions of user 122 with topology graph 520, such as expansion and/or folding of multi-level group node 530/540. Visualization manager 110 may be configured to detect UI event(s) generated by the user's interaction with topology graph 520. Any suitable "UI event" may be captured, such as keyboard events (e.g. key press) captured using a keyboard, mouse events (e.g. cursor position, key press) and touch screen events, etc.

Expansion of Multi-Level Group Nodes

According to examples of the present disclosure, expansion of multi-level group node(s) may be performed based on an "expansion condition," such as whether the number of elements visualized exceeds a user-configurable maximum threshold. Some examples will be discussed using FIG. 6, which is a schematic diagram illustrating example expansion 600 of the multi-level group node(s) in FIG. 5. Here, visualization manager 110 may detect a UI event (see "EXPAND" 610) to expand first multi-level group node 530 (G1) via API module 113. In response, visualization manager 110 may update topology graph 520 to expand first multi-level group node 530 (G1) to show more details of its members. See also 601 in FIG. 6.

Figure 6:
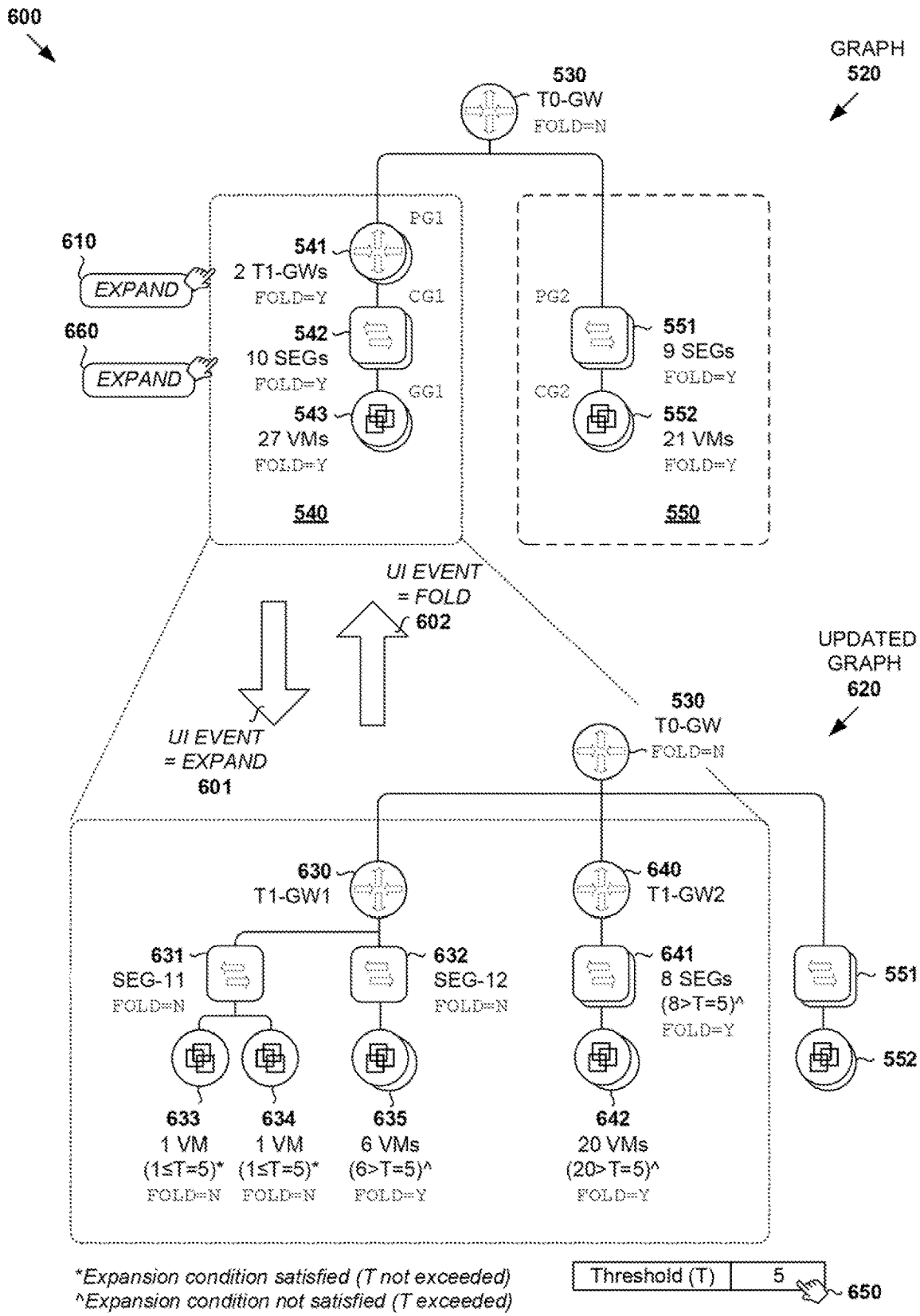
FIG. 6 is a schematic diagram illustrating an example update of a logical network topology graph to expand the multi-level group node(s) in FIG. 5.

At 620 in FIG. 6, in response to detecting a UI event to expand first parent group node 541 (PG1) via API module 113, topology information processor 112 may update topology graph 520 (shown in both FIGS. 5-6). In particular, first parent group node 541 (PG1) may be expanded to include first node 630 visualizing T1-GW1 and second node 640 visualizing T1-GW2. Nodes 630 and 640 may be referred to as "parent nodes" or member nodes of parent group node 541 (PG1). Next, topology information processor 112 may determine whether a group expansion condition is satisfied for node 630/640, such as whether the number of elements exceeds a user-configurable threshold (T)=5. See 650 in FIG. 6 for a UI object (e.g., text box, slider) representing the user-configurable threshold.

For first parent node 630 in FIG. 6, topology information processor 112 may determine that the expansion condition is satisfied. This is because first child group node 542 (CG1) includes two segments (SEG-11 and SEG-12) that are connected with T1-GW1. Since the number of segments does not exceed threshold (T=5), two individual nodes 631-632 may be configured to visualize respective segments SEG-11 and SEG-12 in an expanded state (i.e., FOLD=N). Here, nodes 631-632 may be referred to as "child nodes" or member nodes of child group node 542 (CG1). Further, since SEG-11 is connected with two VMs (i.e., T=5 not exceeded), individual nodes 633-634 may be configured to visualize respective VMs in an expanded state. In contrast, since SEG-12 is connected with 6 VMs (i.e., T=5 exceeded), a single group node (see 635) may be configured to visualize multiple (6) VMs.

For second parent node 640 in FIG. 6, topology information processor 112 may determine that the expansion condition is not satisfied. This is because second child group node 552 (CG2) includes eight segments (SEG-21 to SEG-28) that are connected with T1-GW2. Since the number of segments exceeds the threshold (T=5), a single group node (see 641) may be configured in a folded state to visualize all segments. Based on the folded state, topology information processor 112 may configure grandchild group node 642 in a folded state to visualize 20 VMs that are connected with segments SEG-21 to SEG-28 regardless of whether the threshold (T=5) is exceeded for each individual segment or VM.

In the above, based on first UI event=EXPAND (see 610) to expand parent group node 541, child group node 542 may be expanded or split up (e.g., into nodes 631 and 632). Alternatively, user 122 may select child group node 542 for expansion without expanding parent group node 541 first. For example, based on second UI event=EXPAND (see 660) to expand child group node 542, corresponding parent group node 541 may be expanded or split up into nodes 630 and 640 because threshold=5 is not exceeded. In this case, the expansion of child group node 542 results in the same graph 620 as the expansion of parent group node 541.

Through interactions between visualization manager 110 and user device 120, first multi-level group node 540 may be transitioned between (a) an expanded state based on UI event(s) for expansion (see 601 in FIG. 6) and (b) a folded state based on UI event(s) for collapsing or folding (see 602 in FIG. 6). Depending on the desired implementation, second multi-level group node 550 may be expanded or folded in a similar manner. Topology graph 520 may provide a high-level view of the set of logical network elements, while updated (i.e., expanded) graph 620 may provide a more detailed view of particular group node(s) to facilitate various management operations.

Interactive Multi-Level Group Node(s)

Figure 7:
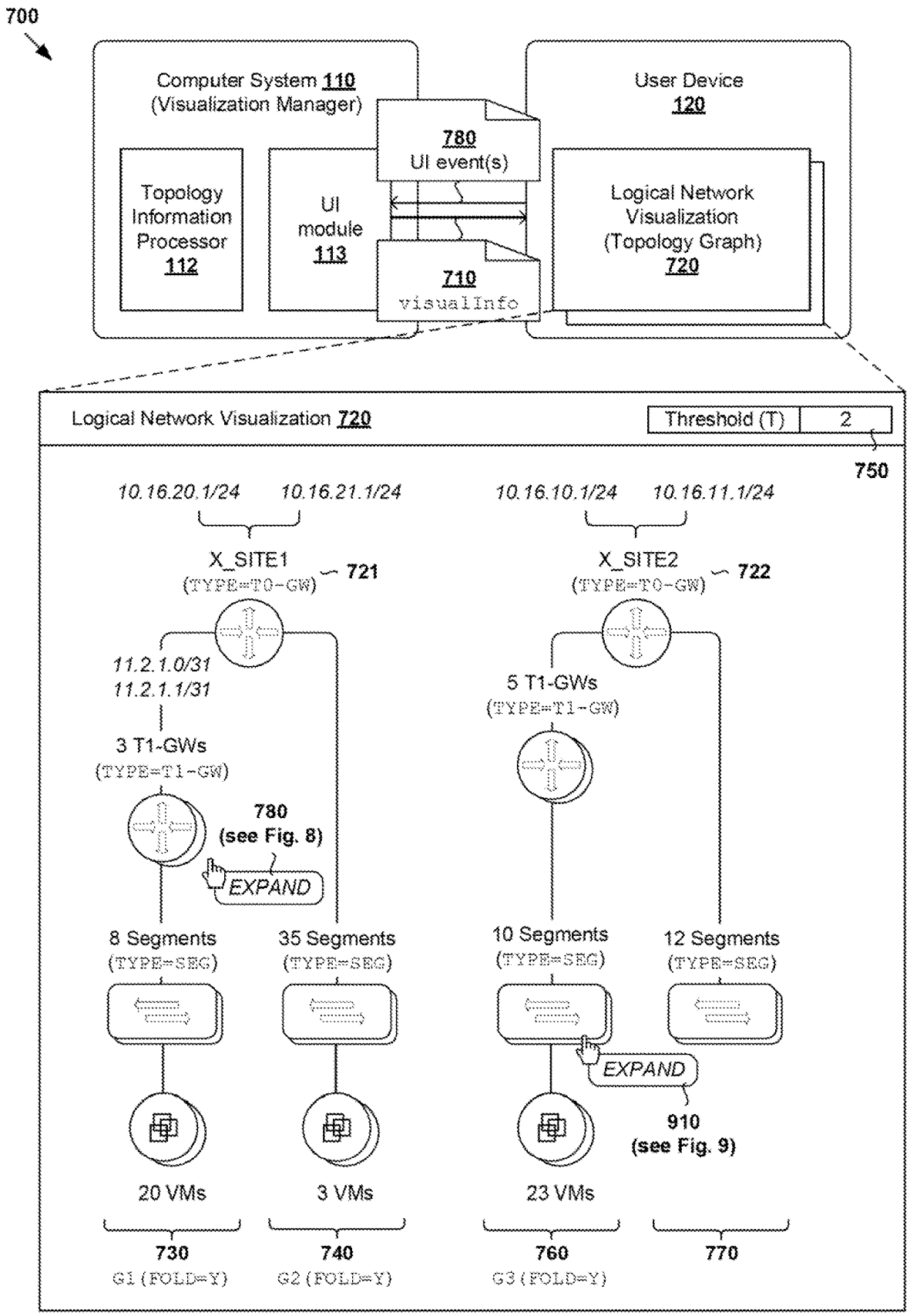
FIG. 7 is a schematic diagram illustrating a first example of logical network visualization with multi-level group node(s) in a folded state.
Figure 8:
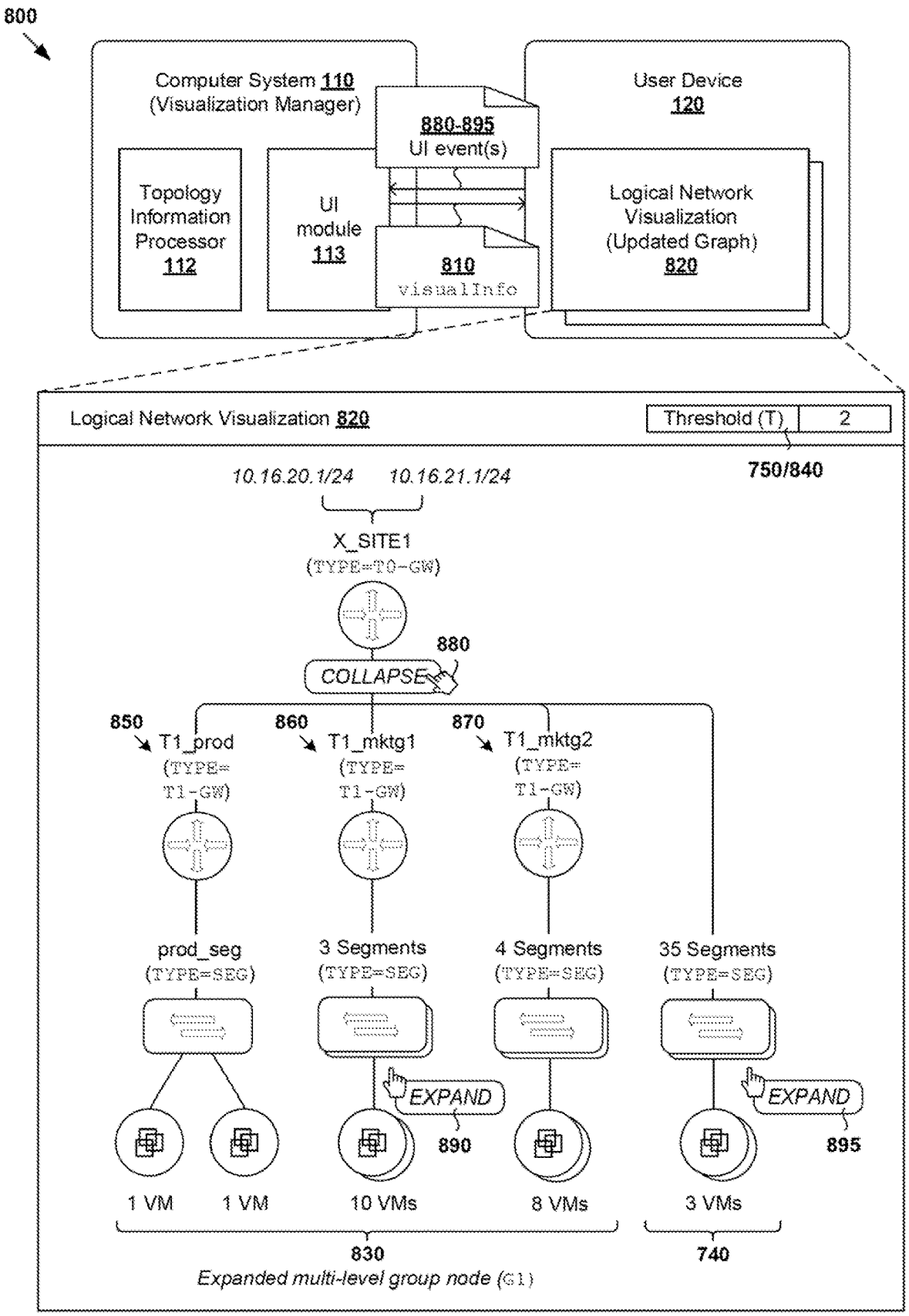
FIG. 8 is a schematic diagram illustrating a second example of logical network visualization with multi-level group node(s) in an expanded state.
Figure 9:
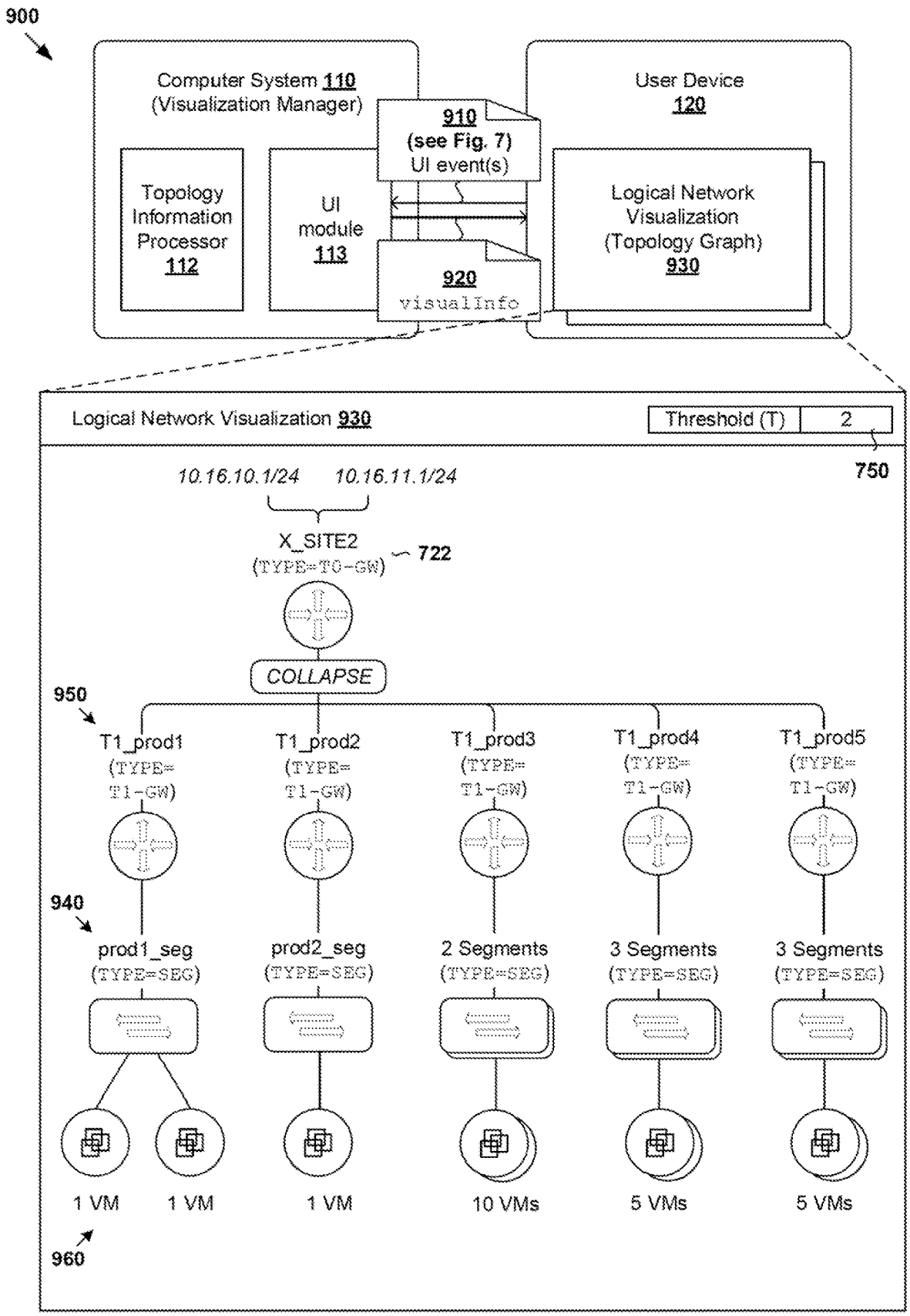
FIG. 9 is a schematic diagram illustrating a third example of logical network visualization with multi-level group node(s) in an expanded state.

Further examples will be explained using FIGS. 7-9. FIG. 7 is a schematic diagram illustrating first example 700 of logical network visualization with multi-level group node(s) in a folded state; and FIG. 8 is a schematic diagram illustrating second example 800 of logical network visualization with multi-level group node(s) in an expanded state. FIG. 9 is a schematic diagram illustrating third example 900 of logical network visualization with multi-level group node(s) in an expanded state.

(a) Folded State

Referring first to FIG. 7, visualization manager 110 (e.g., topology information processor 112) may process topology information to identify a set of logical network elements that are distributed over two data center sites and generate a topology graph to visualize the set. Visualization manager 110 may interact with user device 120 via API module 113 by generating and sending visualization information (see 710) to cause a display of the topology graph (see 720) on a user interface on user device 120. The topology graph may visualize the set of logical network elements, including multiple T0 gateways (see "TYPE=T0-GW"), T1 gateways (see "TYPE=T1-GW"), segments (see "TYPE=SEG"), etc.

For a first T0 gateway (see "X_SITE1") at a first data center site, multi-level group nodes may be configured based on different resource types and linked with a root node (see 721) visualizing the T0 gateway. At 730 in FIG. 7, based on a first resource type (see "TYPE=T1-GW"), a first multi-level group node may be configured to include (a) a parent group node with parent group information "3 T1-GWs" to visualize three T1 gateways; (b) a child group node with child group information "8 Segments" to visualize eight segments; and (c) a grandchild group node to visualize "20 VMs." Each of the segments may be connected with zero or more of the VMs. Further, at 740, a second multi-level group node may be configured to include (a) a parent group node to visualize "35 Segments"; and (b) a child group node to visualize "3 VMs." At 750, an expansion condition is set at threshold=2, which means that two or more nodes will be automatically grouped in topology graph 720.

For a second T0 gateway (see "X_SITE2") at a second data center site, a multi-level group node may be connected with a root node (see 722) visualizing the T0 gateway. In particular, at 760, a multi-level group node may be configured to include (a) a parent group node to visualize 5 T1 gateways; (b) a child group node to visualize 10 segments; and (c) a grandchild group node to visualize 23 VMs. Each of the 47 segments may be connected with zero or more of the six VMs. At 770, a single group node may be configured to visualize "12 Segments" connected with the T0 gateway.

Multi-level group nodes 730-740, 760 are configured to be interactive, in that each group node may be expanded and folded as desired to adjust the visualization granularity. For example in FIG. 7, visualization manager 110 may detect a UI event (see 780) to expand the parent group node in first multi-level group node 730.

(b) Expanded State

Referring now to FIG. 8, in response to detecting a UI event to expand a parent group node, visualization manager 110 may update topology graph 720 in FIG. 7 to include multiple parent nodes. This may involve visualization manager 110 generating updated visualization information (see 810) and sending it to user device 120 via API module 113. The visualization information is to cause a display of an updated topology graph (see 820) on a user interface of user device 120.

At 830 in FIG. 8, visualization manager 110 may expand first multi-level group node 730 in FIG. 7 to include three parent nodes for respective T1 gateways labelled as "T1_prod," "T1_mktg1," and "T1_mktg2." For each parent node, visualization manager 110 may determine whether an expansion condition is satisfied based on threshold (T)=2 (see 840). This means that the expansion condition is satisfied in response to determination that (a) a parent node visualizing an element (e.g., T1 gateway) is in an expanded state and (b) the number of element(s) that are connected with that element (e.g., T1 gateway) does not exceed the threshold.

At 850 in FIG. 8, for example, the expansion condition is satisfied for a first parent node ("T1_prod") visualizing a first T1 gateway, which is connected with a single segment and two VMs. Based on the single segment connected with the first T1 gateway, it is determined that threshold T=2 is not exceeded. This is also true for the two VMs connected with the single segment. As such, individual nodes are configured to visualize the respective segment (i.e., child node "prod_seg") and VMs (i.e., grandchild nodes "1 VM").

In contrast, at 860 in FIG. 8, the expansion condition is not satisfied for a second parent node ("T1_mktg1") visualizing a second T1 gateway, which is connected with three segments and 10 VMs (i.e., T=2 exceeded for both cases). Similarly, at 870, the expansion condition is not satisfied for a third parent node ("T1_mktg2") visualizing a third T1 gateway connecting with four segments and eight VMs (i.e., T=2 exceeded for both cases).

At 880 in FIG. 8, visualization manager 110 may detect UI events based on interactions of user 122 with topology graph 820, such as to collapse (expanded) multi-level group node 830 to return to the high-level view in FIG. 7. In another example, at 890, a UI event may be detected to expand a child group node ("3 Segments") that is connected to the second T1 gateway ("T1_mktg1"). In a further example, at 895, a UI event may be detected to expand a group node ("35 Segments") belonging to another multi-level group node 740. It should be understood that the threshold is user-configurable. Multiple thresholds may be configured for different resource types, different levels associated with the elements, etc.

Based on the examples in FIGS. 7-8, the expansion of a parent group node ("3 T1-GWs") associated with X_SITE1 may split up its child group node ("8 Segments") based on threshold=2. Alternatively, a child group node may be expanded without first expanding its parent group node. For example in FIG. 7, visualization manager 110 may detect UI event=EXPAND (see 910) to expand a child group node ("10 Segments") associated with X_SITE2 while its parent group node ("5 T1-GWs") is in a folded state. Referring now to FIG. 9, in response to detecting UI event 910, visualization manager 110 may generate and send visualization information 920 to update topology graph 930 based on expansion condition 750 (threshold=2).

At 940 in FIG. 9, the child group node ("10 Segments" in FIG. 7) may be expanded into multiple nodes, each to visualize one segment (e.g., "prod1_seg" and "prod2_seg") or multiple segments (e.g., "2 Segments" and "3 Segments") as a group. At 950, since the child group node is expanded, its parent group node ("5 T1-GWs" in FIG. 7) is also expanded or split up into five individual nodes to visualize respective T1-GWs (see "T1_prod1" to "T1_prod5") connected to per segment or group of segments. At 960, since the child group node is expanded, its grandchild group node (see "23 VMs" in FIG. 7) is also expanded to visualize the number of VMs connected to each segment or group of segments. As such, expanding a child group node (e.g., segments) also expands both its parent group node (e.g., T1-GWs) and grandchild group node (e.g., VMs). This way, user 122 may be provided with a greater control to adjust their desired visualization granularity to improve efficiency.

Container Implementation

Although explained using VMs 131-136, it should be understood that public cloud environment 200 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 9, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 9. For example, a computer system capable of acting as visualization manager 110 that includes topology information collector 111, topology information processor 112 and UI (e.g., API) module 113 may be deployed.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a computer system to perform logical network visualization, wherein the method comprises:
   obtaining topology information associated with a set of logical network elements;
   processing the topology information to identify, from the set of logical network elements, (a) multiple first elements that are connected with (b) multiple second elements, wherein each of the multiple first elements is connected with one or more of the multiple second elements;
   configuring a logical network topology graph to visualize the set of logical network elements, wherein the logical network topology graph is configured to include a multi-level group node that is formed using:
   (a) a parent group node configured in a folded state to visualize the multiple first elements and associated with parent group node information;
   (b) a child group node configured in a folded state to visualize the multiple second elements and associated with child group node information; and
   interacting with a user device to cause display of the parent group node and the child group node along with the respective parent group node information and child group node information.

2. The method of claim 1, wherein interacting with the user device further comprises:
   in response to detecting a user interface (UI) event to expand the parent group node, updating the logical network topology graph to expand both the parent group node and the child group node based on an expansion condition.

3. The method of claim 2, wherein interacting with the user device further comprises:
   determining whether the expansion condition is satisfied for a particular parent node from the parent group node based on a threshold of the number of particular second elements that are connected to a particular first element visualized using the particular parent node.

4. The method of claim 3, wherein interacting with the user device further comprises:
   in response to determination that the expansion condition is not satisfied, configuring a single node in a folded state to visualize particular second elements that are connected with the particular first element;
   otherwise, in response to determination that the expansion condition is satisfied, configuring multiple nodes to visualize respective particular second elements that are connected with the particular first element.

5. The method of claim 1, wherein interacting with the user device further comprises:
   in response to detecting a user interface (UI) event to expand the child group node, updating the logical network topology graph to expand both the parent group and the child group node based on an expansion condition.

6. The method of claim 1, wherein configuring the logical network topology graph comprises at least one of the following:
   based on the topology information, generating the parent group information to identify a resource type or the number of the multiple first elements; and
   based on the topology information, generating the child group information to identify a resource type or the number of the multiple second elements.

7. The method of claim 1, wherein configuring the logical network topology graph comprises:
   configuring the logical network topology graph to include the multi-level group node, being a first multi-level group node, based on a first resource type associated with the multiple first elements; and
   configuring the logical network topology graph to include a second multi-level group node based on a second resource type associated with multiple third elements from the set of logical network elements, wherein both the multiple first elements and the multiple third elements are connected to a common element.

8. A non-transitory computer-readable storage medium that includes a set of instructions which, in response to execution by a processor of a computer system, cause the processor to perform a method of logical network visualization, wherein the method comprises:
   obtaining topology information associated with a set of logical network elements;
   processing the topology information to identify, from the set of logical network elements, (a) multiple first elements that are connected with (b) multiple second elements, wherein each of the multiple first elements is connected with one or more of the multiple second elements;
   configuring a logical network topology graph to visualize the set of logical network elements, wherein the logical network topology graph is configured to include a multi-level group node that is formed using:

(a) a parent group node configured in a folded state to visualize the multiple first elements and associated with parent group node information;
(b) a child group node configured in a folded state to visualize the multiple second elements and associated with child group node information; and interacting with a user device to cause display of the parent group node and the child group node along with the respective parent group node information and child group node information.

9. The non-transitory computer-readable storage medium of claim 8, wherein interacting with the user device further comprises:

in response to detecting a user interface (UI) event to expand the parent group node, updating the logical network topology graph to expand both the parent group node and the child group node based on an expansion condition.

10. The non-transitory computer-readable storage medium of claim 9, wherein interacting with the user device further comprises:

determining whether the expansion condition is satisfied for a particular parent node from the parent group node based on a threshold of the number of particular second elements that are connected to a particular first element visualized using the particular parent node.

11. The non-transitory computer-readable storage medium of claim 9, wherein interacting with the user device further comprises:

in response to determination that the expansion condition is not satisfied, configuring a single node in a folded state to visualize particular second elements that are connected with the particular first element;

otherwise, in response to determination that the expansion condition is satisfied, configuring multiple nodes to visualize respective particular second elements that are connected with the particular first element.

12. The non-transitory computer-readable storage medium of claim 8, wherein interacting with the user device further comprises:

in response to detecting a user interface (UI) event to expand the child group node, updating the logical network topology graph to expand both the parent group and the child group node based on an expansion condition.

13. The non-transitory computer-readable storage medium of claim 8, wherein configuring the logical network topology graph comprises at least one of the following:

based on the topology information, generating the parent group information to identify a resource type or the number of the multiple first elements; and based on the topology information, generating the child group information to identify a resource type or the number of the multiple second elements.

14. The non-transitory computer-readable storage medium of claim 8, wherein configuring the logical network topology graph comprises:

configuring the logical network topology graph to include the multi-level group node, being a first multi-level group node, based on a first resource type associated with the multiple first elements; and configuring the logical network topology graph to include a second multi-level group node based on a second resource type associated with multiple third elements from the set of logical network elements, wherein both the multiple first elements and the multiple third elements are connected to a common element.

15. A computer system, comprising:
a processor to process topology information associated with a set of logical network elements to identify, from the set of logical network elements, (a) multiple first elements that are connected with (b) multiple second elements, wherein each of the multiple first elements is connected with one or more of the multiple second elements;

the processor to configure a logical network topology graph to visualize the set of logical network elements, wherein the logical network topology graph is configured to include a multi-level group node that is formed using:

(a) a parent group node configured in a folded state to visualize the multiple first elements and associated with parent group node information;
(b) a child group node configured in a folded state to visualize the multiple second elements and associated with child group node information; and the processor to interact with a user device via a user interface module to cause display of the parent group node and the child group node along with the respective parent group node information and child group node information.

16. The computer system of claim 15, wherein the processor is to interact with the user device by performing the following:

in response to detecting a user interface (UI) event to expand the parent group node, update the logical network topology graph to expand both the parent group node and the child group node based on an expansion condition.

17. The computer system of claim 16, wherein the processor is to interact with the user device by performing the following:

determine whether the expansion condition is satisfied for a particular parent node from the parent group node based on a threshold of the number of particular second elements that are connected to a particular first element visualized using the particular parent node.

18. The computer system of claim 17, wherein the processor is to interact with the user device by performing the following:

in response to determination that the expansion condition is not satisfied, configure a single node in a folded state to visualize particular second elements that are connected with the particular first element;

otherwise, in response to determination that the expansion condition is satisfied, configure multiple nodes to visualize respective particular second elements that are connected with the particular first element.

19. The computer system of claim 15, wherein the processor is to interact with the user device by performing the following:

in response to detecting a user interface (UI) event to expand the child group node, update the logical network topology graph to expand both the parent group and the child group node based on an expansion condition.

20. The computer system of claim 15, wherein the processor is to configure the logical network topology graph by performing at least one of the following:

based on the topology information, generate the parent group information to identify a resource type or the number of the multiple first elements; and based on the topology information, generate the child group information to identify a resource type or the number of the multiple second elements.

21. The computer system of claim 15, wherein the processor is to configure the logical network topology graph by performing the following:
configure the logical network topology graph to include the multi-level group node, being a first multi-level group node, based on a first resource type associated with the multiple first elements; and
configure the logical network topology graph to include a second multi-level group node based on a second resource type associated with multiple third elements from the set of logical network elements, wherein both the multiple first elements and the multiple third elements are connected to a common element.

* * * * *